United States Patent Office 3,166,515
Patented Jan. 19, 1965

3,166,515
PRODUCTION OF URANIUM AND
PLUTONIUM MONOCARBIDE
Ronald George Sowden, Wallingford, England, assignor to United Kingdom Atomic Energy Authority, London, England
No Drawing. Filed Nov. 29, 1961, Ser. No. 155,846
Claims priority, application Great Britain Dec. 2, 1960
2 Claims. (Cl. 252—301.1)

The invention relates to the production of uranium monocarbide and mixtures thereof with plutonium monocarbide, which are useful nuclear fuel materials.

According to the invention, a method of producing uranium monocarbide, and mixtures thereof with plutonium monocarbide containing up to 30 moles percent of plutonium monocarbide, comprises reacting a uranium oxide, or a mixture thereof with a plutonium oxide containing up to 30 moles percent of the plutonium oxide, with substantially the stoichiometric proportion of elemental carbon to form the monocarbide, at a temperature not exceeding 1500° C. while maintaining a pressure not exceeding 200 microns of mercury over the reactants and continuously removing the gaseous products of the reaction.

In the reaction of uranium and plutonium oxides with the stoichiometric proportion of carbon to form the monocarbides, carbon monoxide is formed, and it has previously been found necessary to heat the reactants to a temperature of at least 1800° C. to induce the reaction to proceed at a reasonable rate. It has now been found that the reaction can be induced to proceed at a high rate of temperatures of 1500° C. or below by the method of the invention, and even at temperatures as low as 1350° C. the reaction will proceed at a reasonable rate.

Experiments have shown that the equilibrium pressure of carbon monoxide over reactants consisting of uranium dioxide and carbon is related to the temperature by the relationship:

$$\log p = 15.11 - \frac{19320}{T}$$

where $p$ is the pressure in microns of mercury, and $T$ is the absolute temperature. This means that at 1200° C. the equilibrium pressure is only 100 microns, at 1350° C. it is about 1 millimetre of mercury, and at 1500° C. is about 10 millimetres. The equilibrium pressure only reaches atmospheric pressure at about 1800° C. The reaction will only proceed at a reasonable rate at any particular temperature if the partial pressure of carbon monoxide is maintained substantially below the equilibrium pressure for that temperature, and it has been found necessary to reduce the pressure over the reactants below 200 microns and maintain it below that level, by pumping off the carbon monoxide as it is formed, to induce the reaction to proceed at a reasonable rate at or below 1500° C.

The following table shows the average times for 50% and 98.5% reaction of stoichiometric proportions of uranium dioxide and carbon to form uranium monocarbide obtained at various temperatures by maintaining the pressure over the reactants below 200 microns of mercury, together with the variation due to the method of mixing the reactants:

| Temperature (° C.) | Time (in minutes) for— | |
|---|---|---|
| | 50% conversion | 98% conversion |
| 1,350 | 43±26 | 250±150 |
| 1,400 | 16±10 | 100±65 |
| 1,450 | 6±4 | 37±23 |
| 1,500 | 2.6±1.6 | 16±10 |

The most rapid reactions at a particular temperature occurred with the reactants mixed as loose powders; the slowest occurred with strongly compacted powders.

It has been found that mixtures of uranium monocarbide and plutonium monocarbide can also be produced by the method of the invention, provided that the plutonium oxide in the starting materials does not exceed 30 moles percent of the combined uranium and plutonium oxides. Above 30 moles percent, volatile plutonium compounds tend to be formed, due probably to the limited mutual solubility of the uranium and plutonium monocarbides. Below 30 moles percent, however, single-phase mixed carbide is formed. Preferably the uranium and plutonium oxides in the starting materials are in intimate mixture, preferably formed by the calcining of co-precipitated uranium and plutonium oxalates which produces a very homogeneous mixture of the oxides.

The following examples describe particular embodiments of the invention.

*Example I*

67.5 g. stoichiometric uranium dioxide and 9.80 g. carbon, having surface areas of 5 sq. m./g. and 30 sq. m./g. respectively, were intimately mixed together and placed in a loosely packed condition in a graphite crucible inside a silica vacuum envelope. The mixture was then heated electrically to 1380° C. by high-frequency induction under a pressure which did not exceed 150 microns of mercury throughout the heating period. The pressure was maintained below 150 microns by means of a pumping system having a large backing volume, thus removing the carbon monoxide rapidly from the mixture as it was formed. After 17 minutes, the reaction mixture was allowed to cool and the product found to contain 50 moles percent of uranium monocarbide.

*Example II*

A similar mixture to that used in Example I was heated under the same conditions for 80 minutes. The product was then found to contain 98 moles percent of uranium monocarbide.

A similar mixture heated at the same temperature, but under atmospheric pressure, showed practically no reaction over a long period.

*Example III*

A mixture of 85 moles percent uranium (IV) oxalate and 15 moles percent plutonium (III) oxalate was precipitated from a solution of uranium (IV) nitrate and plutonium (III) nitrate in these proportions, by the addition of oxalic acid in excess. The precipitate was dried, calcined at 500° C., and then reduced at 500° C. in hydrogen to yield a free flowing powder of mixed uranium/plutonium dioxide. 10 g. of this powder was mixed with 1.33 g. of carbon having a surface area of 30 sq. m./g. and heated for 80 minutes under the same conditions as in Example I, except that the temperature was 1420° C. The product was found to contain 98.5 moles percent of single-phase uranium/plutonium monocarbide.

I claim:

1. The method of producing a mixture of uranium monocarbide and plutonium monocarbide comprising reacting a mixture of uranium oxide and a plutonium oxide containing not more than 30 moles percent of the plutonium oxide with substantially the stoichiometric proportions of elemental carbon to form uranium monocarbide and plutonium monocarbide at a temperature not in excess of about 1500° C. and maintaining a pressure not in excess of 200 microns of mercury over the reactants by continuously pumping off the gaseous products of the reaction, and recovering the formed uranium monocarbide and plutonium monocarbide.

2. The method of producing a mixture of uranium monocarbide and plutonium monocarbide which comprises co-precipitating a mixture of uranium oxalate and plutonium oxalate containing not more than 30 moles percent of plutonium oxalate from an aqueous solution thereof, calcining the oxalates, reducing the calcined oxalates to form an intimate mixture of uranium dioxide and plutonium dioxide containing not more than 30 moles percent plutonium dioxide, reacting the intimate mixture of uranium dioxide and plutonium dioxide with substantially the stoichiometric proportions of elemental carbon to form uranium monocarbide and plutonium monocarbide at a temperature not in excess of about 1500° C. and maintaining a pressure not in excess of 200 microns of mercury over the reactants by continuously pumping off the gaseous products of the reaction and recovering the formed uranium monocarbide and plutonium monocarbide.

References Cited in the file of this patent

UNITED STATES PATENTS

| | | |
|---|---|---|
| 2,864,666 | Calkins | Dec. 16, 1958 |
| 2,868,707 | Alter et al. | Jan. 13, 1959 |
| 2,905,552 | Holden | Sept. 22, 1959 |

OTHER REFERENCES

Murray: "2nd Geneva Conf. on Peaceful Uses of Atomic Energy," vol. 6, pages 543–544, September 1958.

Murray: "2nd Geneva Conference on Peaceful Uses of Atomic Energy," vol. 6, p. 549, September 1958.

Meerson: "Soviet J. of Atomic Energy," November 1960, Consultants Bureau Translation, vol. 9, No. 5, pp. 927–31, September 1961.

AEC Doc. BMI 1403, pp. 58, 59, January 1, 1960.

Young: "J. of Chem. Soc.," pages 4534, 4535, November 1960.

BMI 1441, pages 66, 67, 69, May 31, 1960.